Aug. 26, 1930.   N. S. DWYER   1,774,134
SEPARABLE BUTTON
Filed March 27, 1929
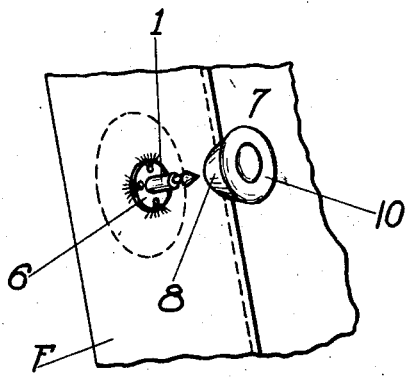
Fig. 1
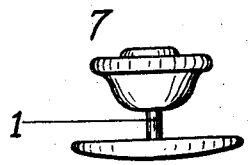
Fig. 2
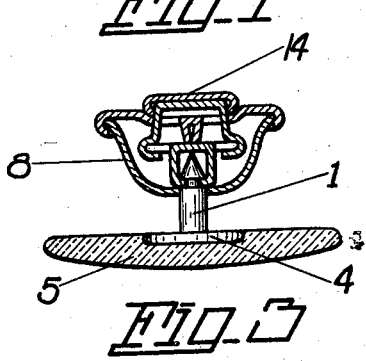
Fig. 3
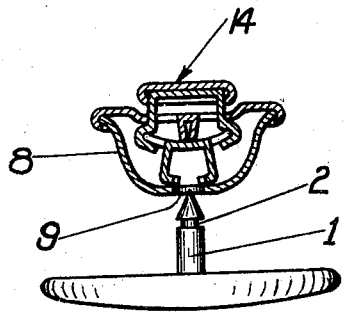
Fig. 4
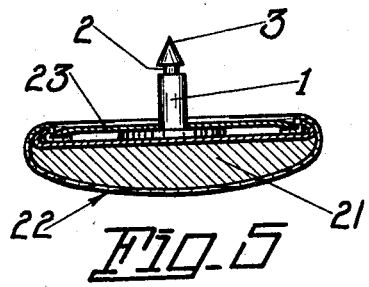
Fig. 5
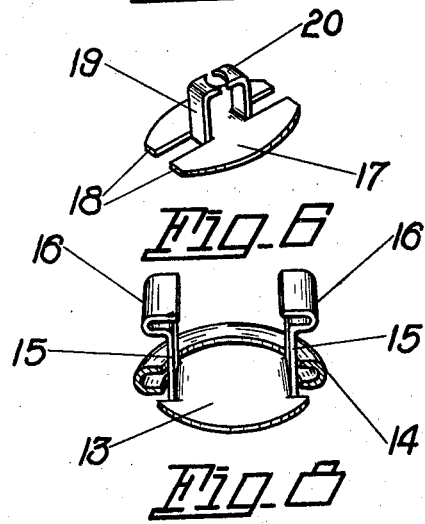
Fig. 6
Fig. 8
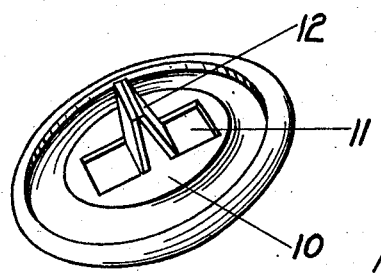
Fig. 7
NELLIE SHEPHERD DWYER Inventor
By Herbert E. Smith Attorney Patented Aug. 26, 1930

1,774,134

UNITED STATES PATENT OFFICE

NELLIE SHEPHERD DWYER, OF PUYALLUP, WASHINGTON

SEPARABLE BUTTON

Application filed March 27, 1929. Serial No. 350,181.

My present invention relates to improvements in separable buttons of the type in which a rigid head and a resilient socket fastener are employed and adapted to be joined together by a snap action, or separated, as desired.

The button and fastener of my invention are adapted for use as a stud button in dress shirts, cuff links, and all detachable jewelry, or for use as a removable button on garments that require frequent laundering, such as nurses' uniforms, barbers' jackets, coats worn by professional men, and all other garments and uniforms.

The invention consists in certain novel combinations and arrangements of parts in the resilient socket fastener and the stud of the button-head as will hereinafter be more fully set forth and claimed.

In the accompanying drawings I have illustrated one complete example of the physical embodiment of my invention (and a slight modification of the button-head) wherein the parts are combined and arranged according to the best mode I have thus far devised for the practical application of the principles of my invention.

Figure 1 is a view showing a fragment of a garment with the stud of the button passed through an eyelet, and the socket fastener in position to be secured on the stud.

Figure 2 shows the parts secured together.

Figure 3 is an enlarged sectional view of the parts in Figure 2.

Figure 4 is a view showing the resilient socket fastener in section and separated from the stud.

Figure 5 is a sectional detail view of a modified form of button-head.

Figure 6 is a perspective view of resilient keeper of the socket fastener.

Figure 7 is a perspective view showing the interior of the socket fastener with parts removed.

Figure 8 is a perspective view of the socket-slide.

A usual type of stud 1, having an annular groove 2 and point 3, is rigidly secured by its flat disk 4 in the button-head 5, and the latter may be fashioned of suitable material, ornamental or otherwise, depending upon the use for which it is intended.

In Figure 1 an eyelet 6 is shown sewed to a piece of fabric F that may form any suitable garment, and the stud 1 is passed through the eyelet in position to receive the resilient socket fastener which is indicated as a whole by the numeral 7.

The socket fastener comprises a cap or cup 8 having a hole 9 for the stud, and a plate 10 is rigidly crimped or clamped on the edge of the cap. The cup and the cap plate are circular, and as best seen in Figure 7 the plate has a pair of diametrically arranged slots 11 therein and a pair of central tongues 12 fashioned from the turned up metal of the plate. These tongues form a fulcrum post that projects into the interior of the cap, and the slots of the plate are adapted to receive a slide-head that may be pushed into the cap of the socket fastener, and by the use of the fingers or finger nails, the slide head may be pulled out, slightly, from the socket fastener. This slide head is constructed of resilient metal, and comprises a flat circular disk 13 with a cover-plate 14 crimped on its edges, and the disk is fashioned with a pair of arms 15 adapted to slide in the slots 11 of the plate 10. The inner ends of the arms are bent inwardly to form opposing jaws 16, and these jaws are designed to grip a keeper for the stud 1.

The keeper is also fashioned of resilient metal, and as best seen in Figure 6 comprises a flat disk 17 that is slotted or bifurcated to form tongues 18 over which the jaws 16 of the slide head are permanently gripped. From the disk 17 of the keeper are projected the arms 19, and these arms at their free ends are bent inwardly and notched to form opposing jaws 20 that clasp the stud and engage in the annular grooves of the stud, to prevent its withdrawal from the socket fastener.

In the modified form of the button-head in Figure 5, the head 21 is covered with cloth or other material as 22, and a fastener 23 is used to secure the cover on the head. The stud is the same as in the other figures of the drawing and is rigid with the button-head.

In Figure 1, when the socket fastener is applied to the stud, the button-head and the socket fastener are grasped between a thumb and a finger, and the socket fastener is "snapped" on the stud to the position of Figure 3. Here the stud is entered in the hole 9, the jaws 20 have clasped the stud in its annular groove, and the point of the stud frictionally engages the disk 17 of the keeper. At the outer side of the keeper the fulcrum post 12 engages the plate 17 of the keeper and the slide arms 15 of the slide head are spread apart to retain the slide head in the socket and to hold the keeper locked on the stud.

To unfasten the device, the exterior part of the slide head is grasped in the fingers and the slide head pulled outwardly from the socket fastener, closing the spread arms 15, and this closing movement of the arms flexes the slotted disk 17, with the post 12 acting as a fulcrum. Flexing the disk opens the jaws 20 of the keeper and they are released from the stud, thereby permitting withdrawal of the socket fastener from the stud.

Having thus fully described by invention, what I claim as new and desire to secure by Letters Patent is:—

1. The combination with a pointed stud having an annular groove, of a socket-fastener having a slide head, resilient arms on the head and jaws on said arms, a resilient keeper retained by the slide head, arms on the keeper, and jaws on said arms for engaging the grooved stud.

2. The combination with a grooved stud pointed at its outward end, of a socket fastener having a slotted plate and a fulcrum post, a head having arms slidable in the slotted plate, said arms fashioned of resilient material and formed with end jaws, a keeper comprising a plate of resilient material carried in said jaws and adapted to co-act with the post, arms on the keeper, and jaws on said keeper arms for engaging the grooved stud.

3. A separable button comprising: a button head; a pointed stud, projecting outwardly from the center of said head, and having an annular groove near its outward end; a resilient socket fastener having a cap member and a cap plate, and adapted to house and retain a slide head and resilient keeper; said cap plate being provided with slots and inwardly extending tongues adapted to provide a fulcrum for said resilient keeper; said keeper being provided with downwardly extending arms which are formed as jaws adapted to grip the stud by engaging its annular groove; said slide head being provided with arms extending downwardly through the slots in said cap plate and adapted to engage the resilient keeper in a manner that will bend it about the aforementioned fulcrum, when it is moved outwardly and thus release the jaws of the keeper from the annular groove of the stud.

In testimony whereof I affix my signature.

NELLIE SHEPHERD DWYER.